Sept. 7, 1965 HISAO MAEDA 3,205,417
MULTIPLE CERAMIC VARIABLE DISK CAPACITOR
Filed Nov. 7, 1960 2 Sheets-Sheet 1
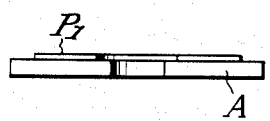
Fig. 1.
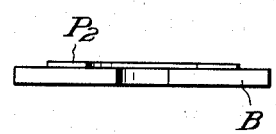
Fig. 2.
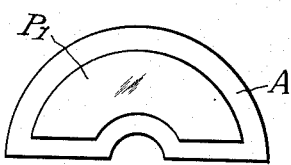
Fig. 3.
Fig. 4.
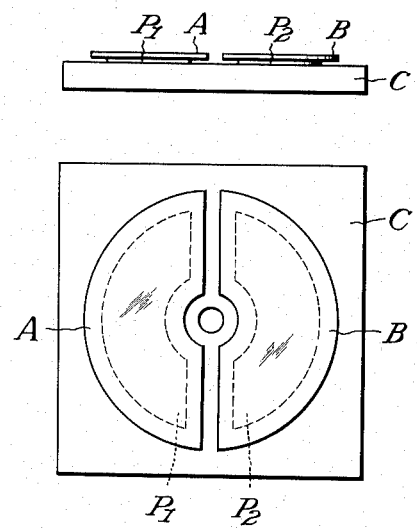
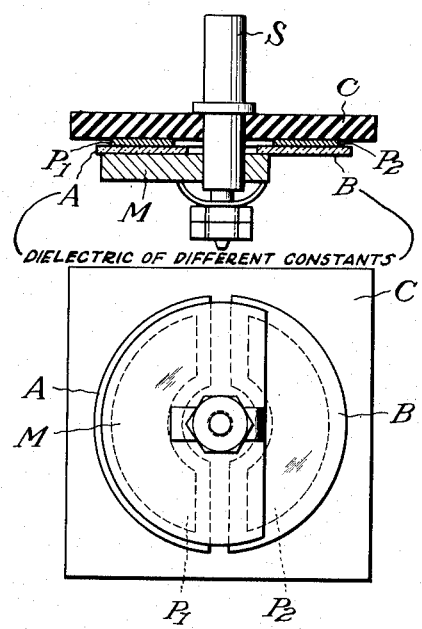
INVENTOR:
HISAO MAEDA
by
Mestern & Kollin
ATTORNEYS Sept. 7, 1965  HISAO MAEDA  3,205,417
MULTIPLE CERAMIC VARIABLE DISK CAPACITOR
Filed Nov. 7, 1960  2 Sheets-Sheet 2

INVENTOR:
HISAO MAEDA
by
Mestern & Kollin,
ATTORNEYS

United States Patent Office 3,205,417
Patented Sept. 7, 1965

3,205,417
MULTIPLE CERAMIC VARIABLE DISK CAPACITOR
Hisao Maeda, Nikkatsu Apt., 13 Shiba-Koen, Minato-ku, Tokyo-to, Japan
Filed Nov. 7, 1960, Ser. No. 67,618
1 Claim. (Cl. 317—249)

This invention relates to electric capacitors, and more particularly, it relates to a new and improved ceramic variable capacitor of the multiple type.

It is an object of this invention to provide a new and improved ceramic, variable capacitor of the multiple type which has two different capacitance ranges so that it can be used commonly for two purposes, for example, as variable capacitor for both FM (VHF frequency modulation) and AM (broadcast band) radio communication.

It is another object of the invention to provide a multiple, ceramic, variable capacitor as stated above, of a small and compact size, suitable for miniaturization, and of a simple, robust, and easily producible construction.

Said and other objects and advantages of the present invention have been achieved by the multiple, ceramic, variable capacitor of this invention, wherein two thin plates of a ceramic which have approximately semi-circular or rectangular plan forms, and which have mutually different dielectric constants e.g., titanium oxide compounds, barium titanate and magnesium titanate, are disposed in the same plane in such positions that their straight-line edges are mutually parallel and positioned on the opposite sides of a common center; a metallic electrode member of approximately semi-circular, or arcuate, plan form is made to adhere to each of the said thin ceramic plates to function as one electrode of the capacitor; and the other metallic electrode member of approximately semi-circular or some other plan form to function as the common electrode member of the capacitor is supported rotatably, relative to the said thin ceramic plates, about the aforesaid common center and in contact with the said thin ceramic plates on their sides which are opposite from those to which the first-mentioned electrode members are adhering.

The details of the invention and the manner in which the aforestated objects, other objects and advantages may best be achieved will be understood more fully from a consideration of the following description of a few embodiments, taken in conjunction with the accompanying drawings in which the same or equivalent parts are designated by the same reference letters and subscripts, and in which:

FIG. 1 is an elevational view and a projectionally corresponding plan view showing one example of the thin ceramic plate of the invention with one of the electrodes of the capacitor adhesively bonded thereto;

FIGS. 2, 5, 6, 7 and 8 are views similar to those of FIG. 1, showing examples of modifications of thin ceramic plate and electrode plate combination;

Figure 5:
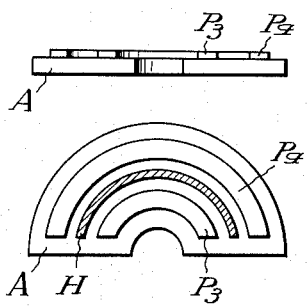

FIG. 3 is an elevational view and a projectionally corresponding plan view showing thin ceramic plates of different dielectric constants to each of which is bonded one of the electrode plates of the capacitor, and which are fastened on a base made from an electric insulation substance for added mechanical strength; and FIG. 4 is an elevational view, principally in section, and a bottom view of one embodiment of the capacitor of the invention in its assembled state.

Referring to the drawings, the plate A of FIG. 1 and the plate B of FIG. 2 are both thin ceramic plates made from a substance, such as titanium oxide, of high dielectric constant, but their respective dielectric constants are different. To said plates A and B are bonded, respectively, electrode plates $P_1$ and $P_2$, which, together, form one of the electrodes of the capacitor. Said plates are in the approximate shape of a semi-circle, a segment of a circle, or a semi-circular arc in plan view and are ordinarily made of silver. As shown in FIG. 3, the said thin ceramic plates of different dielectric constants are bonded to a strong base plate C, which is made of an electric insulation substance such as "steatite," in such a disposition that their respective straight-line edges are in parallel and opposed, their flat surfaces lie in the same plane, and the sides to which the aforesaid electrode plates have been bonded are made to adhere to the base plate C. The purpose of using the said strong insulation flat plate C is to strengthen the said thin ceramic plates, which are mechanically weak by themselves.

The embodiment of the capacitor shown in assembled state in FIG. 4 comprises: a member composed of an insulation base plate C, thin ceramic plates A and B, and electrode plates $P_1$ and $P_2$ and constructed as described above with reference to FIG. 3; a metal plate M of a planar form approaching a semi-circle, which functions as the other electrode of the capacitor, and which is held rotatably, flat against the said ceramic plates on the sides opposite the aforesaid electrode plates $P_1$ and $P_2$; and a shaft S which centrally holds and rotates the said plate M relative to the electrode plates $P_1$ and $P_2$, the said plate M being held against the thin ceramic plates A and B by such means as a spring, tightening nut, and lock nut or by molecular attraction.

If the ceramic plate A is made to have a higher de-electric constant than B, for example, if the capacity of the A side is adapted to be a maximum of 300 $\mu\mu f.$ and that of the B side is adapted to be 20 $\mu\mu f.$, it will be possible to use the A side for AM signal reception and the B side for FM signal reception. That is, when the A side is to be used, the capacity between the plate $P_1$ and the plate M is varied by varying the area of the metal plate M which confronts the electrode $P_1$ of the A side. In the operational position shown in FIG. 4, the said capacity is the maximum. Also when the B side is to be used, the capacity between the electrode $P_2$ and the plate M is varied by varying the area of the metal plate M which confronts the electrode $P_2$ of the B side. In the operational position shown in FIG. 4, the capacity is the minimum. By suitably selecting the configurations of the electrode $P_1$ and $P_2$, it is possible to design at will the variational curve of capacity versus control angle.

Figure 6:
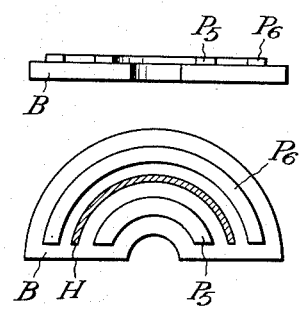

FIGS. 5 and 6 show, respectively, thin ceramic plates A and B, which are provided, respectively, with the two electrode plates each, $P_3$, $P_4$ and $P_5$, $P_6$. With this arrangement, both A and B are suitable for use in a radio receiver of the superheterodyne type. In FIGS. 5 and 6, the portions designated by the reference letter H are slits cut in their respective thin ceramic plates and are provided for the purpose of making each of the capacities between $P_3$ and $P_4$ and between $P_5$ and $P_6$ a minimum.

Figure 7:
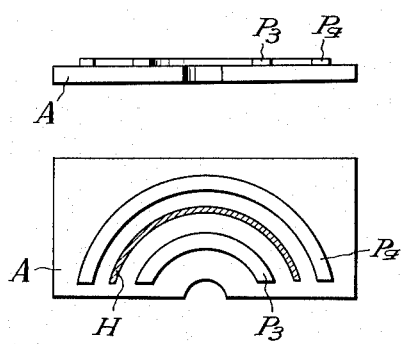
Figure 8:
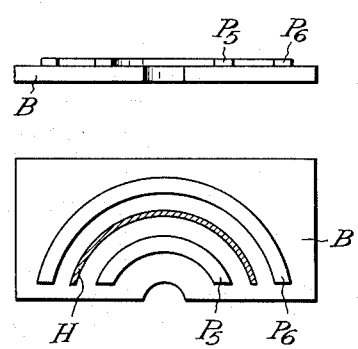

The members shown in FIGS. 7 and 8 differ only in rectangular plan form of their ceramic plates from those shown in FIGS. 5 and 6 which have semi-circular plan form.

In the embodiments of this invention, the thin ceramic plates and metal plates M are preferably finished by lapping. The ceramic plate used as the strengthening plate of the thin ceramic plates is also preferably lapped. For the metal plate which is adapted to rotate, as one electrode of the capacitor, in contact with the thin ceramic plates may be constructed in the form of a thin metallic plate which is bonded to a strengthening plate. When the said strengthening plate is used, since mechanical strength is thereby obtained, a member comprising a ceramic plate, of considerably higher dielectric constant than the plates A and B, to one surface of which a metallic layer has been made to adhere can be used, instead of the metal plate M, in the same manner as a metal plate. In this case, of course, the capacitor construction is so adapted that the surface of the said ceramic plate which does not have the said metallic layer is caused to rotate in mutual contact with the ceramic plates A and B. It is obvious that the curve of capacity versus angular position of the capacitor can be varied by suitably designing the configuration of the metal plate. By the present invention, since it is possible to obtain two kinds of variable capacitors without increasing the thickness of the variable capacitor, it is possible to provide a multiple variable capacitor which is suitable for use in miniature telecommunication receivers.

Since it is obvious that many changes and modifications can be made in the above described details without departing from the nature and spirit of the invention, it is to be understood that the invention is not to be limited to the details described herein except as set forth in the appended claim.

What I claim is:

A multiple ceramic variable capacitor commonly usable for frequency modulation and broadcast range communication and suitable for use in miniaturized equipment, which consists of an insulator base plate provided with a central shaft hole; two substantially semi-circular electrodes fixed to the same surface of said base plate, parallel to each other with respect to their straight line edges but leaving a space therebetween and opposed to each other on the sides of their common center; two thin ceramic plates having identical semi-circular shape of smaller diameter than said electrodes and of considerably different dielectric constant from each other, concentrically affixed to said electrodes; a metal plate of planar form functioning as the opposite electrode disposed below said ceramic plates; a shaft centrally and rotatably holding said metal plate relative to said ceramic plates; and means for urging said metal plate against said ceramic plates.

References Cited by the Examiner

UNITED STATES PATENTS

| | | | |
|---|---|---|---|
| 2,499,634 | 3/50 | Ehlers et al. | 317—249 |
| 2,535,367 | 12/50 | Minnium | 317—249 |
| 2,688,177 | 9/54 | Wagner | 317—249 |
| 2,913,644 | 11/59 | Bleazey | 317—249 |

FOREIGN PATENTS

| | | |
|---|---|---|
| 2,978,651 | 4/61 | Canada. |
| 462,639 | 3/37 | Great Britain. |
| 845,404 | 8/60 | Great Britain. |

JOHN F. BURNS, *Primary Examiner.*

SAMUEL BERNSTEIN, JOHN P. WILDMAN, E. JAMES SAX, *Examiners.*